(12) United States Patent
Tagaito

(10) Patent No.: US 10,807,645 B2
(45) Date of Patent: Oct. 20, 2020

(54) SKELETON STRUCTURE OF VEHICLE FRONT PART

(71) Applicant: TOYOTA JIDOSHA KABUSHIKI KAISHA, Toyota-shi (JP)

(72) Inventor: Takashi Tagaito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 45 days.

(21) Appl. No.: 16/260,174

(22) Filed: Jan. 29, 2019

(65) Prior Publication Data

US 2019/0233014 A1 Aug. 1, 2019

(30) Foreign Application Priority Data

Jan. 30, 2018 (JP) .................................. 2018-013324

(51) Int. Cl.
*B62D 21/12* (2006.01)
*B62D 21/15* (2006.01)

(52) U.S. Cl.
CPC .................................. *B62D 21/152* (2013.01)

(58) Field of Classification Search
CPC .................................................... B62D 21/152
See application file for complete search history.

(56) References Cited

U.S. PATENT DOCUMENTS

2015/0191203 A1* 7/2015 Okamoto ................ B60R 19/02
296/187.1
2015/0298634 A1* 10/2015 Hara ....................... B60R 19/24
293/133

FOREIGN PATENT DOCUMENTS

JP 2015-147437 8/2015

* cited by examiner

*Primary Examiner* — Lori L Lyjak
(74) *Attorney, Agent, or Firm* — Oblon, McClelland, Maier & Neustadt, L.L.P.

(57) ABSTRACT

A reinforcement member has a load-receiving portion and an inclined portion. At least a part of the load-receiving portion is placed in front of a Fr side member. An end, at an inner side in the width direction, of the inclined portion matches in the width direction of the vehicle with a ridgeline at an inner side, in the width direction of the vehicle, of the Fr side member, or is provided at an outer side, in the width direction of the vehicle, in relation to the ridgeline.

1 Claim, 13 Drawing Sheets

SKELETON STRUCTURE OF VEHICLE FRONT PART

CROSS REFERENCE TO RELATED APPLICATION

This application claims priority to Japanese Patent Application No. 2018-013324 filed on Jan. 30, 2018, which is incorporated herein by reference in its entirety including the specification, claims, drawings, and abstract.

TECHNICAL FIELD

The present disclosure relates to a skeleton structure of a front part of a vehicle.

BACKGROUND

A skeleton structure is provided at a front part of a vehicle in order to absorb impact at an engine compartment (vehicle front part structure) at a front side in relation to a cabin (vehicle cabin) and to secure a cabin space during a front collision of the vehicle (hereinafter, also referred to as "front collision").

For example, as a skeleton structure of the front part of the vehicle, there are provided a pair of left and right front side members (hereinafter, also referred to as "Fr side members") which extend in a front-and-rear direction of the vehicle. Further, a bumper reinforcement (hereinafter, also referred to as a "bumper R/F") which extends in a width direction of the vehicle is provided over front ends of the pair of Fr side members.

As a form of the front collision, a small overlap (SOL) collision is known. In this form of collision, the vehicle collides with a barrier (obstruction) having a width of about ¼ of a vehicle width from a side end of the vehicle. In this process, a region, of the bumper R/F, of a width of about ¼ of the vehicle width from the side end of the vehicle receives a collision load. Further, with this process, the collision load is transferred to a crash box at a further rear side and to the Fr side member.

As exemplified in FIGS. 7 and 8, a bumper R/F 100 is, for example, a hollow member having a closed cross section structure, and absorbs energy of the collision by collapse-deforming from the front side during the front collision. Further, the energy of the collision is absorbed by collapse deformation of a crash box 104 and folding deformation of a Fr side member 102, or the like. With the absorption of the energy of the collision, the vehicle is decelerated.

For example, in JP 2015-147437 A, side bulk which is a reinforcement member is provided in the bumper R/F, at a location positioned in front of the crash box. The side bulk is fixed to a front surface portion of the bumper R/F. During the small overlap collision, of the front surface portion of the bumper R/F, a bending load to an outer side in the width direction of the vehicle and to a rearward direction is input to a location positioned in front of the crash box, and a tensile stress is generated at this location. The side bulk functions as a reinforcement member against the tensile stress, and suppresses folding of the bumper R/F caused by the tensile stress.

The side bulk is formed by injection-molding a resin, and absorbs the collision energy during the front collision by collapse-deforming along with the bumper R/F.

During the small overlap collision, there may be cases where the vehicle passes through the barrier in a state where there still remains a further margin of absorption of the collision energy. As exemplified in FIG. 9, in the small overlap collision, a barrier 106 collides with a location deviated from a center C of a vehicle 108. In addition, in order to reduce the air resistance and from the viewpoint of design, for the front surface of the vehicle, a design is employed in which the design is inclined in the rearward direction, from the center in the width direction toward the outer side. Due to the collision form and the vehicle front surface structure as described, during the small overlap collision, a force is generated which causes the vehicle 108 to pass through the barrier 106, in a slanted front side on an opposite side from the barrier 106.

As the vehicle moves in a slanted front direction with respect to the barrier 106, the bumper R/F 100 is caused to collapse-deform by the barrier 106, as exemplified in FIGS. 10 and 11. As exemplified in FIG. 11, when the barrier 106 reaches an end in the width direction of a bumper R/F 100, the vehicle 108 passes through the barrier 106.

Further, a folding bead 102A which becomes a fold starting point to an inner side is provided on the Fr side member 102 at a rear side of the bumper R/F 100. Thus, a structure is provided in which, by the Fr side member 102 folding to the inner side, a tip of the Fr side member 102 is opened to an outer side in the width direction, and passing-through of the barrier 106 is prevented. However, as shown in FIG. 11, there may be cases where the vehicle 108 passes through the barrier 106 before a portion, of the portions of the bumper R/F 100, at a front side of the Fr side member 102 receives a collision load and is collapsed and a sufficient load is transferred to the Fr side member 102 which is at a rear side of the bumper R/F 100; that is, before the Fr side member 102 is folded to the inner side (a front end is opened).

In order to prevent the passing-through of the vehicle 108 from the barrier 106 and to reliably decelerate the vehicle, as exemplified in FIG. 12, a configuration may be considered in which a reinforcement member 110 of a high rigidity is provided at a portion, of the bumper R/F 100, in front of the Fr side member 102. Specifically, a structure may be employed in which, by making the portion in front of the Fr side member 102 to be easily collapsed, the portion may function as a hook for the barrier 106, and the collision load may be easily transferred to the Fr side member 102.

However, the passing-through is a problem unique to the small overlap collision, and in other forms of collision such as, for example, a full-lap front surface collision and a pole front surface collision or the like, it is desirable to cause the collapse deformation of the bumper R/F 100, and absorb the collision energy. In addition, as exemplified in FIG. 13, during the front collision, in a front wall 100A of the bumper R/F 100, a boundary portion between a reinforcement member 110 and an inner side thereof may be sheared and the bumper R/F 100 may be ruptured.

SUMMARY

According to one aspect of the present disclosure, there is provided a skeleton structure of a front part of a vehicle. The structure comprises a pair of side skeleton members, a bumper reinforcement, and a reinforcement member. The pair of the side skeleton members are provided on respective sides in a width direction of the vehicle, and extend in a front-and-rear direction. The bumper reinforcement extends in the width direction of the vehicle, and is connected to front ends of the pair of the side skeleton members. The bumper reinforcement also has a hollow, closed cross section structure.

The reinforcement member has a higher rigidity than the bumper reinforcement, and is housed in the bumper reinforcement. Further, the reinforcement member comprises a load-receiving portion and an inclined portion. The load-receiving portion has a length in the front-and-rear direction of the vehicle matching a length, in the front-and-rear direction of the vehicle, inside the bumper reinforcement. The inclined portion is provided at an inner side, in the width direction of the vehicle, of the load-receiving portion, and has a length, in the front-and-rear direction of the vehicle, reduced as a position from the load-receiving portion is separated in the inner side in the width direction of the vehicle and the inclined portion is gradually separated from a front surface of the bumper reinforcement. At least a part of the load-receiving portion is placed in front of the side skeleton members. An end, in an inner direction in the width direction, of the inclined portion matches in the width direction of the vehicle with a ridgeline of the side skeleton member at an inner side in the width direction of the vehicle, or is provided at an outer side, in the width direction of the vehicle, of the ridgeline.

According to the present disclosure, employing an inclined portion at an inner side, in the width direction of the vehicle, of the reinforcement member, and a shape without a corner (beveled shape), can suppress the shearing during the front collision at the boundary portion between a location, of the front wall of the bumper reinforcement, where the reinforcement member is housed and a location where the reinforcement member is not housed. Further, by employing an arrangement in which the reinforcement member does not extend (protrude) to the inner side, in the width direction of the vehicle, of the side skeleton member, it becomes possible to cause the collapse deformation of the bumper reinforcement in forms of front collisions other than the small overlap collision.

BRIEF DESCRIPTION OF DRAWINGS

Embodiment(s) of the present disclosure will be described by reference to the following figures, wherein.

DESCRIPTION OF EMBODIMENTS

A skeleton structure of a front part of a vehicle according to an embodiment of the present disclosure will now be described with reference to FIGS. 1-6. In FIGS. 1-6, a front-and-rear direction of the vehicle (hereinafter, also simply referred to as "front-and-rear direction") is shown by an axis represented by reference sign FR, a width direction of the vehicle (hereinafter, also simply referred to as "width direction") is shown by an axis represented by reference sign RW, and a vertical direction is shown by an axis represented by a reference sign UP. The reference sign FR is an abbreviation for "front," and the front-and-rear direction axis FR has a front direction of the vehicle as a positive direction. The reference sign RW is an abbreviation for "right width," and the width direction axis RW has a right width direction as a positive direction. The height axis UP has the upward direction as a positive direction.

Figure 1:
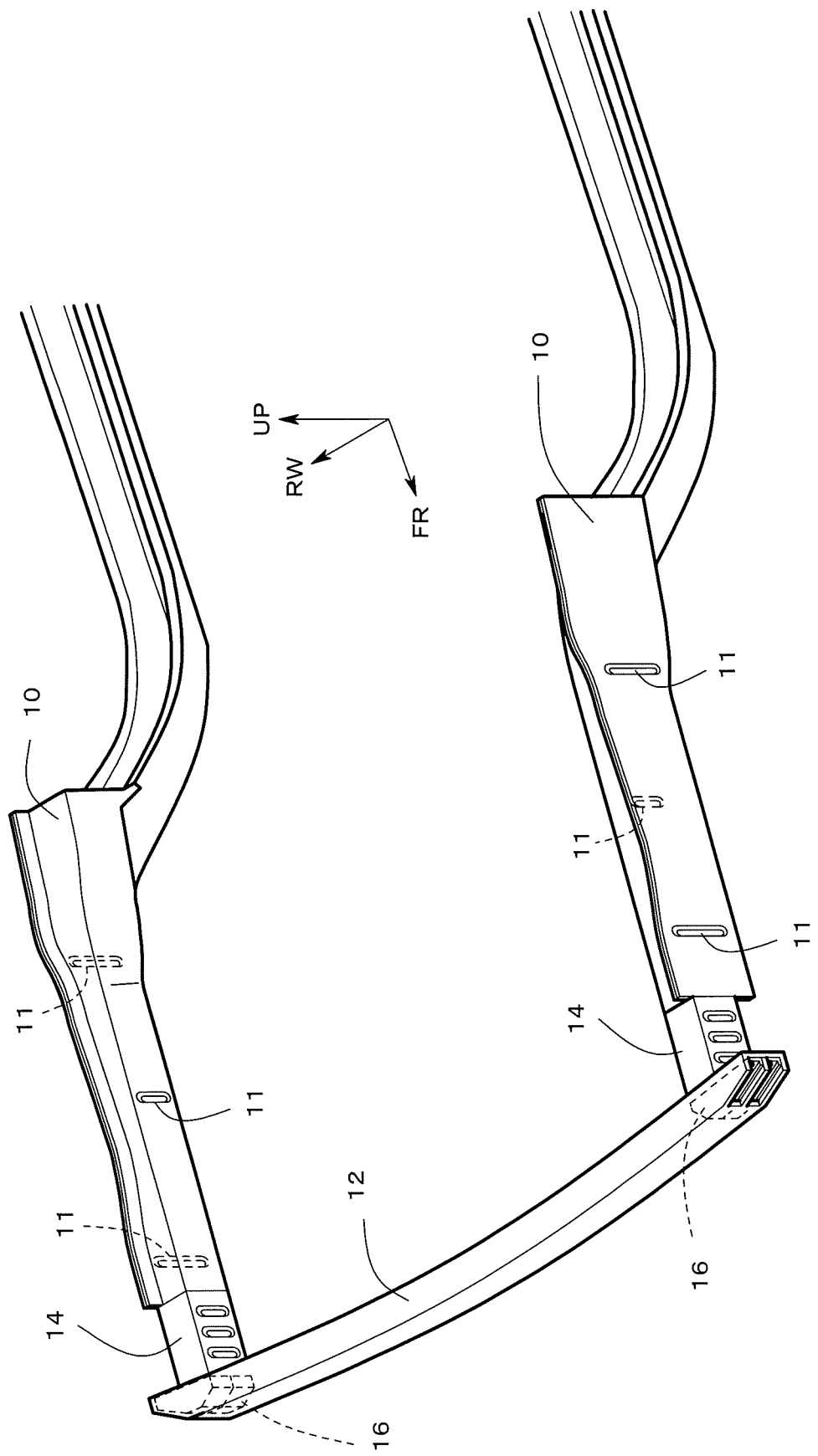
FIG. 1 is a perspective diagram exemplifying a skeleton structure of a front part of a vehicle according to an embodiment of the present disclosure.

As shown in FIG. 1, the FR axis, the RW axis, and the UP axis are orthogonal to each other. In the following, in the description of the skeleton structure of the front part of the vehicle according to the present embodiment, these three axis are referred to as a reference. For example, a "front end" refers to an end of an arbitrary member in a positive direction side of the FR axis, and a "rear end" refers to an end of an arbitrary member in a negative direction side of the FR axis. Similarly, a "width inner side" refers to a relatively inner side in the width direction of the vehicle along the RW axis, and a "width outer side" refers to a relatively outer side in the width direction of the vehicle along the RW axis. Further, an "upper side" refers to a relatively positive direction side of the UP axis, and a "lower side" refers to a relatively negative direction side of the UP axis.

FIG. 1 is a perspective diagram of a skeleton structure of a front part of a vehicle according to the present embodiment. The skeleton structure exemplified in FIG. 1 is only an upper structure, and a lower structure of the skeleton structure such as, for example, a suspension member or the like, is not shown.

The skeleton structure of the front part of the vehicle according to the present embodiment comprises Fr side members 10, 10, a bumper R/F 12, crash boxes 14, 14, and reinforcement members 16, 16.

The Fr side members 10, 10 are a pair of side skeleton members provided at respective sides, in the width direction of the vehicle, of the front part of the vehicle, and extend in a front-and-rear direction. Between the Fr side members 10, 10, a drive source of an internal combustion engine, a peripheral device such as a radiator and an intake, or the like are mounted. For example, the Fr side members 10, 10 are formed as hollow members having a closed cross section structure.

In addition, on side surfaces (outer side surface and inner side surface in the width direction) of the Fr side members 10, 10, a plurality of folding beads 11 (recess beads) extending in the up-and-down direction are formed in the front-and-rear direction, as a starting point of a folding deformation (deformation start point). During the front collision, the folding bead 11 formed on the outer side surface of the Fr side member 10 enters the inside in the width direction, and the folding bead 11 formed on the inner side surface protrudes in the outer side in the width direction, so that the Fr side members 10, 10 are fold-deformed (in a W shape). With such a folding deformation, front ends of the Fr side member 10, 10 are opened toward the outer side in the width direction, and passing-through of a barrier 40 is prevented during the small overlap collision.

Figure 2:
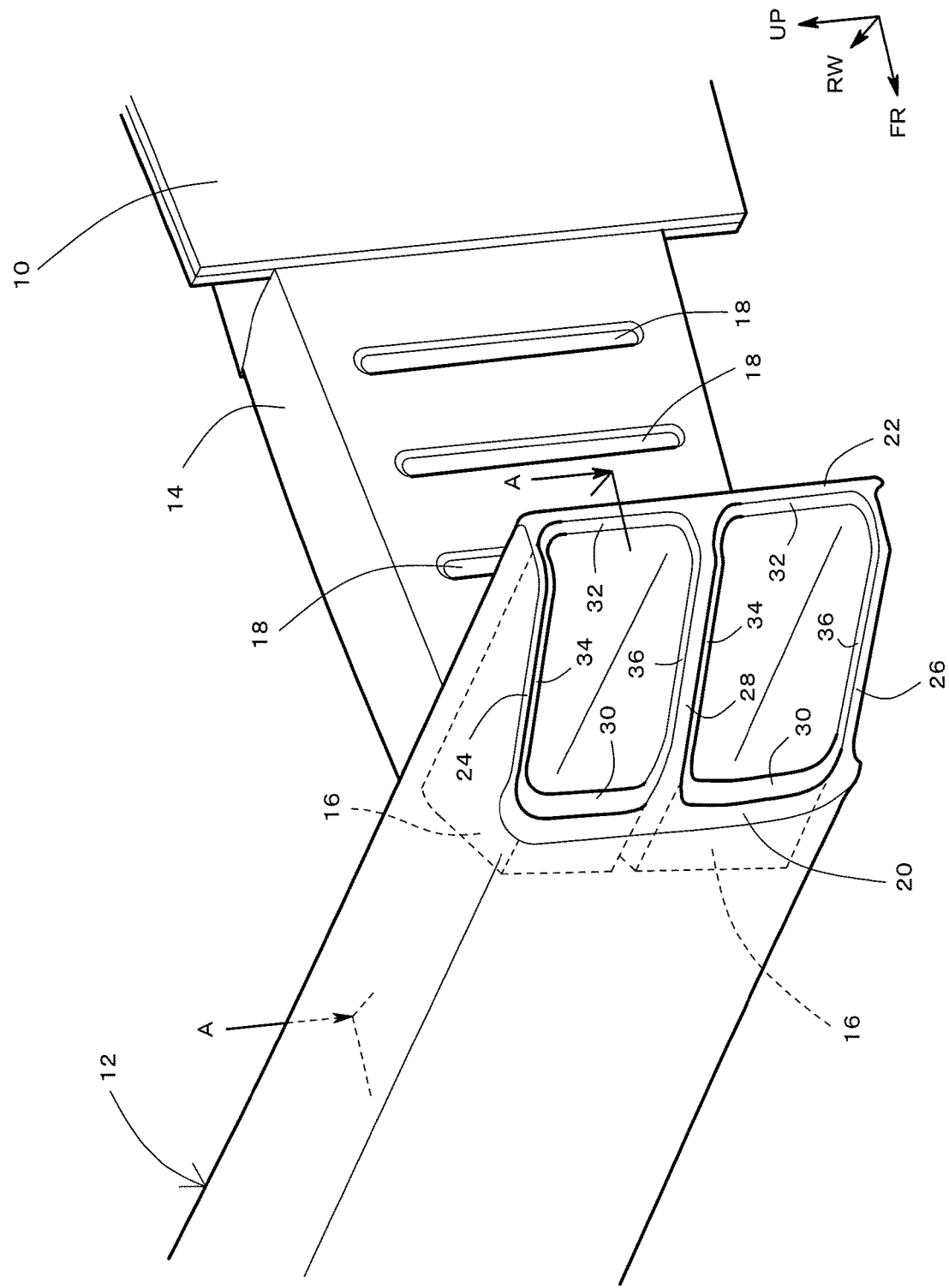
FIG. 2 is an enlarged perspective diagram of a region around an end, in a width direction of a bumper reinforcement, of a skeleton structure of a front part of a vehicle according to an embodiment of the present disclosure.

The crash boxes 14, 14 are provided between front ends of the Fr side members 10, 10, and the bumper R/F, and connect these members. The crash box 14 has a structure which is more easily collapse-deformed in comparison to the Fr side member 10 and the bumper R/F 12. For example, as shown in FIG. 2, a plurality of folding beads 18 which become a deformation starting point and which extend in the up-and-down direction are formed on the crash box 14 in the front-and-rear direction. The crash box 14 is formed from a material of a lower rigidity than the Fr side member 10 and the bumper R/F 12, and is formed, for example, by press-molding or extrusion-molding an aluminum plate. As will be described below, during the front collision, for example, the crash box 14 is collapse-deformed in a bellows shape, and absorbs the collision energy.

The bumper R/F 12 is a skeleton member which extends in the width direction, and which is connected to front ends of the Fr side members 10, 10 (via the crash boxes 14, 14). As exemplified in FIG. 1, the bumper R/F 12 has an approximate are shape, with a center portion in the width direction protruding in the front side in comparison to ends in the width direction.

The bumper R/F 12 has a hollow, closed cross section structure. In addition, ends of the bumper R/F 12 in the width direction have the front side cut in a slanted manner. Specifically, as exemplified in FIG. 2, a rear-side wall 22 of the bumper R/F 12 protrudes in an outer side in the width direction in comparison to a front-side wall 20 of the bumper R/F 12, and an upper wall 24 and a lower wall 26 connecting the front-side wall 20 and the rear-side wall 22 have ends in the width direction inclined. With such a configuration, an outer appearance of side ends of the front part has a design with a curved shape.

As exemplified in FIG. 2, in an internal space of the bumper R/F 12, an intermediate wall 28 is provided which extends in the front-and-rear direction of the vehicle and which separates the internal space in the up-and-down direction. In the present embodiment, at the ends of the bumper R/F 12 in the width direction, the reinforcement member 16 is housed in the upper and lower internal spaces separated by the intermediate wall 28. The reinforcement member 16 may be provided at one end of the bumper R/F 12 in the width direction (right end or left end), or may be provided on both ends.

The reinforcement member 16 is formed from a member having a higher rigidity than the bumper R/F 12. For example, the reinforcement member 16 is formed from the same member as that of the bumper R/F 12, and with a thicker thickness than the bumper R/F 12. Alternatively, a member having a higher rigidity than that of the bumper R/F 12 (for example, a high tensile strength steel) may be used.

Thus, the location of the bumper R/F 12 in which the reinforcement member 16 is housed (hereinafter also referred to as "reinforcement location") is more difficult to be collapse-deformed in comparison to other locations. For example, when the reinforcement member 16 has a higher rigidity than another skeleton member such as the Fr side member 10, in addition to the bumper R/F 12, during the front collision, the other skeleton member is deformed without the reinforcement location of the bumper R/F 12 being collapse-deformed. In this manner, by employing a configuration where a part of the bumper R/F 12 having the function to collapse-deform and to absorb the collision energy is intentionally prevented from the collapse deformation (or is difficult to be deformed), it becomes possible to set the reinforcement location to be the hook for the barrier 40 to be described later, and to suppress passing-through of the vehicle from the barrier 40.

Figure 3:
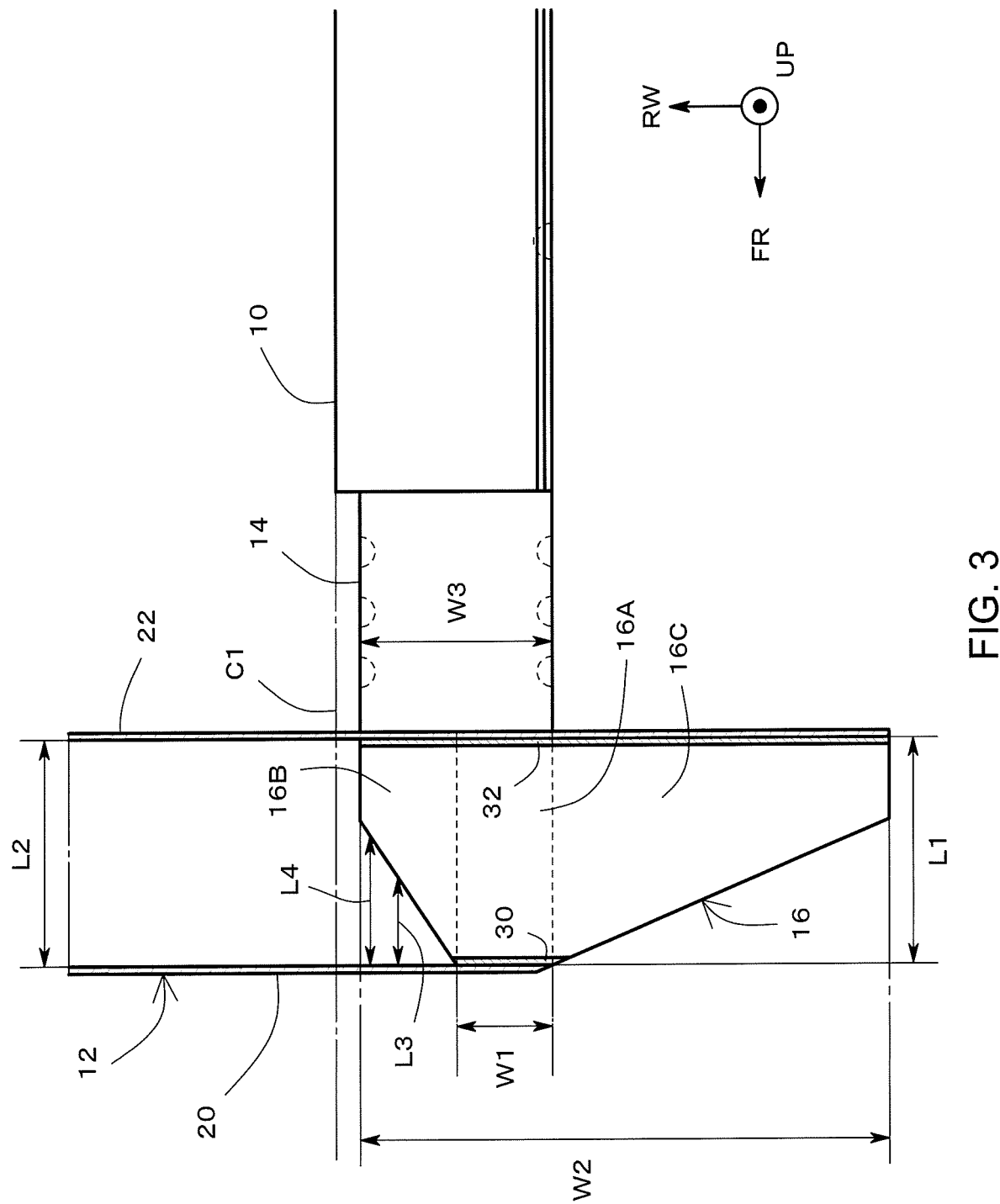
FIG. 3 is an A-A cross-sectional diagram of FIG. 2.

FIG. 2 exemplifies a perspective diagram of the reinforcement member 16, and FIG. 3 exemplifies an A-A cross-sectional diagram thereof. The reinforcement member 16 is a member having an approximate trapezoid shape in the plan view, and has a hollow inside. Specifically, the reinforcement member 16 comprises a front-side wall 30 placed at a front side of the vehicle, a rear-side wall 32 which opposes the front-side wall 30, an upper wall 34 which connects upper ends of the front-side wall 30 and the rear-side wall 32, and a lower wall 36 which connects lower ends of the front-side wall 30 and the rear-side wall 32.

A width W1 of the front-side wall 30 of the reinforcement member 16 is set to be smaller than a width W2 of the rear-side wall 32. The upper wall 34 and the lower wall 36 connecting the front-side wall 30 and the rear-side wall 32 are formed in an inclined (slope) shape, spreading in the width direction toward the rear side of the vehicle.

A length L1, in the front-and-rear direction, of the reinforcement member 16 matches a distance L2 from an inner surface of the front-side wall 20 of the bumper R/F 12 to an inner surface of the rear-side wall 22. In this description, "match" does not only describe a case where L1−L2=0, and includes a case of "substantial match," including a tolerance during assembly.

Because of the above-described shape, the reinforcement member 16 can be divided into a load-receiving portion 16A and inclined portions 16B and 16C. The load-receiving portion 16A is a region where the length L1 in the front-and-rear direction of the reinforcement member 16 matches the length L2 in the front-and-rear direction inside the bumper R/F 12. The inclined portions 16B and 16C are regions on both sides, in the width direction, of the load-receiving portion 16A.

At least a part of the load-receiving portion 16A is placed in front of the Fr side member 10. That is, the load-receiving portion 16A is placed on a line of extension of the Fr side member 10. For example, an arrangement is employed in which a full width W1 of the load-receiving portion 16A is set to a half of a full width W3 of the crash box 14, and the full width W1 is included in front of the Fr side member 10.

With such an arrangement, during the small overlap collision, the collapse deformation in the front-and-rear direction is suppressed on at least a part of a portion, of the bumper R/F 12, in front of the Fr side member 10. With the collapse deformation of the bumper R/F 12 being suppressed, in comparison to the case where the collapse deformation occurs, the collision load can be more efficiently transferred to the Fr side member 10, and the folding deformation of the Fr side member 10 is promoted. With the Fr side member 10 being fold-deformed at an early stage, the front ends of the Fr side member 10 are opened in the outer side in the width direction, and the passing-through of the barrier 40 is suppressed.

The inclined portion 16B is provided at the inner side, in the width direction, of the load-receiving portion 16A. The inclined portion 16B has the length in the front-and-rear direction reduced as the position is separated from the load-receiving portion 16A in the inner side in the width direction, and is gradually separated from the front surface (front-side wall 20) of the bumper R/F 12. The inclined portion 16B is a beveled portion of the reinforcement member 16, and has a function to suppress shearing of the bumper R/F 12 during the front collision.

An end, in the inner side in the width direction, of the inclined portion 16B matches in the width direction with a ridgeline C1 at an inner side in the width direction of the Fr side member 10, or is provided at an outer side in the width direction in relation to the ridgeline C1. In other words, in the present embodiment, a structure is employed in which the reinforcement member 16 does not protrude toward the inner side in the width direction in relation to the Fr side member 10. With such a structure, the collapse deformation of the bumper R/F 12 can be enabled during the front collision other than the small overlap collision (such as the full lap front collision, pole front collision, or the like). In other words, a crash stroke of the bumper R/F 12 is secured in front collisions other than the small overlap collision.

Thus, in the present embodiment, by placing the load-receiving portion 16A of the reinforcement member 16 at a portion, of the bumper R/F 12, in front of the Fr side member 10, the collapse deformation of this portion is suppressed, and folding deformation of the Fr side member 10 at an early stage is enabled. In addition, the inner side in the width direction of the reinforcement member 16 is set as the inclined portion 16B by forming a beveled structure, so that the sharing, during the front collision, of the boundary portion, of the bumper R/F 12, of regions where presence or absence of the reinforcement member 16 is switched, is suppressed. Further, by employing an arrangement in which the reinforcement member 16 is housed at an outer side in the width direction in relation to the ridgeline C1 of the Fr side member 10, the collapse deformation of the bumper R/F 12 can be enabled during the front collisions other than the small overlap collision.

Further, by providing the inclined portion 16B in the reinforcement member 16, a "collapsing margin" of the bumper R/F 12 is changed stepwise. As exemplified in FIG. 3, for example, a gap (separation distance) between the front surface of the reinforcement member 16 and the front-side wall 20 of the bumper R/F 12 is the collapsing margin of the bumper R/F 12. By employing the inclined portion 16B at the inner side in the width direction of the reinforcement member 16, the collapsing margin is gradually reduced such as L4→L3 toward the outer side in the width direction. If the collapsing margin rapidly changes, for example, from 100% to 0%, a load may be concentrated at the boundary portion, and the bumper R/F 12 may be ruptured. With the provision of the inclined portion 16B, the collapsing margin is adjusted on the structure, and the rupturing of the bumper R/F 12 is suppressed.

Further, the inclined portion 16C provided at the outer side in the width direction of the load-receiving portion 16A is configured to match the shape of the bumper R/F 12. As described above, the ends, in the width direction, of the bumper R/F 12 are cut in the front side in a slanted manner. The inclined portion 16C is set to a shape along the slope structure of the ends of the bumper R/F 12, and, when the reinforcement member 16 is fixed on the bumper R/F 12, these members are aligned so that these shapes match.

By employing the same shape for the inclined portion 16C and the ends, in the width direction, of the bumper R/F 12, and aligning the ends of these members, a unity in the outer appearance can be achieved. In addition, alignment, in the width direction, of the reinforcement member 16 with respect to the bumper R/F 12 can be easily done. That is, by matching the ends between the inclined portion 16C and the end, in the width direction, of the bumper R/F 12, the load-receiving portion 16A of the reinforcement member 16 can be placed in front of the Fr side member 10, and, further, the inclined portion 16B can be placed at the outer side, in the width direction, from the ridgeline C1 of the Fr side member 10.

Figure 4:
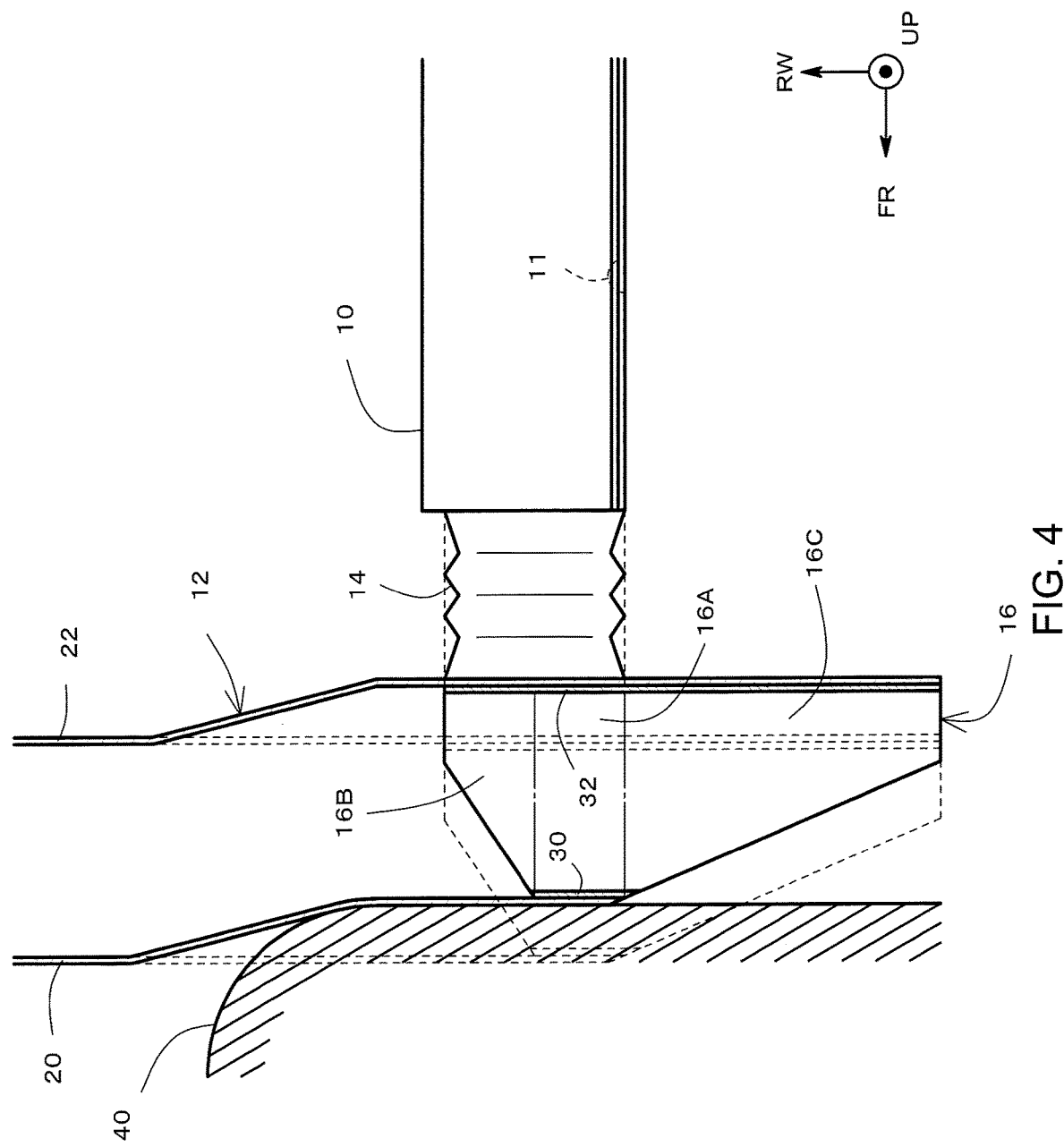
FIG. 4 is a diagram exemplifying an initial stage of small overlap collision.
Figure 5:
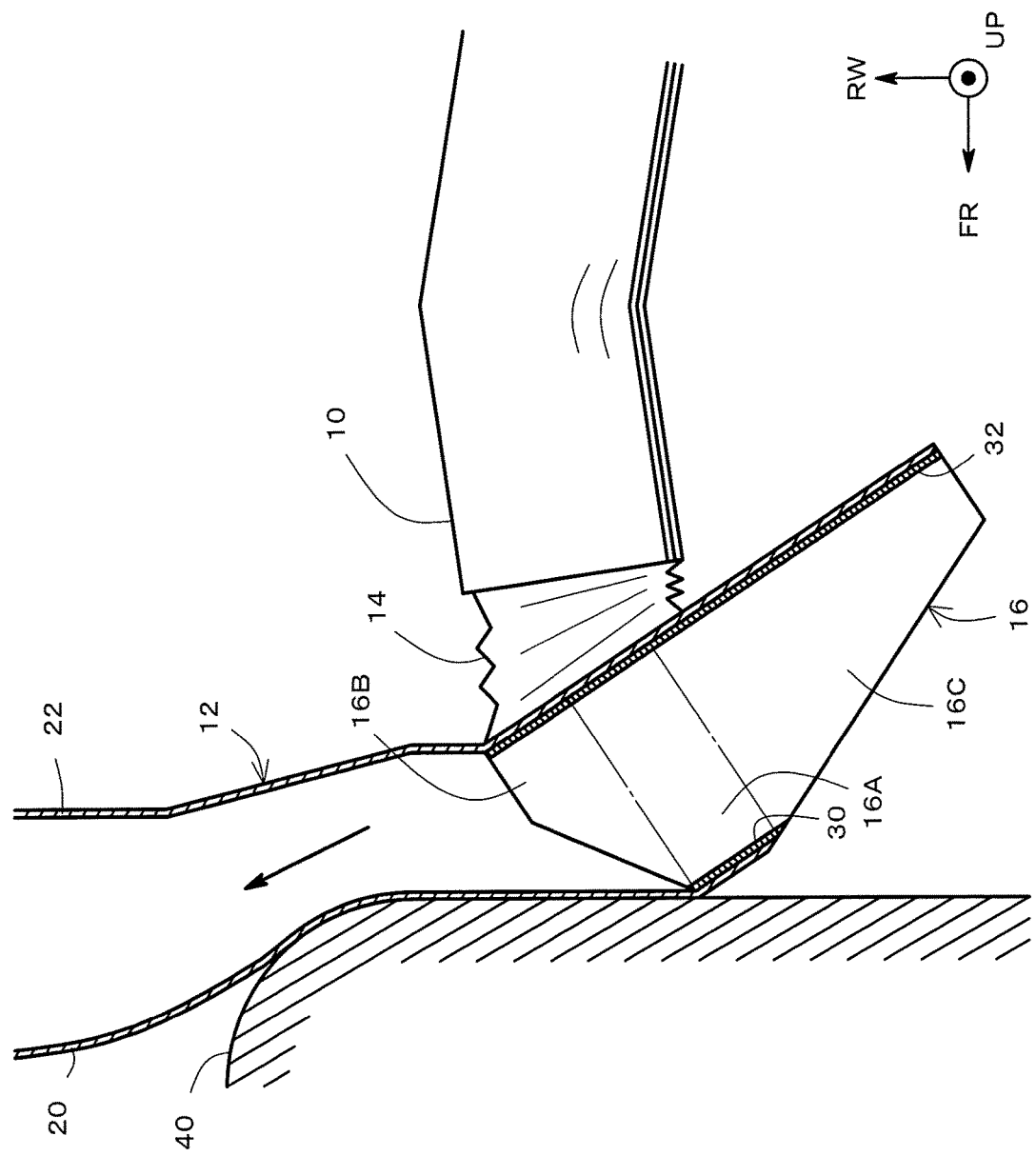
FIG. 5 is a diagram exemplifying progress of small overlap collision.

With reference to FIGS. 4 and 5, a behavior of the skeleton structure of the front part of the vehicle according to the present embodiment during the small overlap collision will be described. FIG. 4 shows an initial stage of the small overlap collision. When the barrier 40 collides with the bumper R/F 12, the load-receiving portion 16A of the reinforcement member 16 receives the barrier 40. A location of a portion of the bumper R/F 12 in which the load-receiving portion 16A is housed transfers the collision load to the rear side with the collapse deformation thereof being suppressed. The crash box 14 at the rear side of the load-receiving portion 16A receives the transferred load, and is collapse-deformed in the bellows shape. Further, the collision load is transferred to the Fr side member 10 behind the crash box 14.

As the collision progresses, as exemplified in FIG. 5, a force is caused to move the vehicle in the slanted front side with respect to the barrier 40. In this process, a portion of the bumper R/F 12 at an inner side in the width direction than the reinforcement member 16 is collapse-deformed. On the other hand, the collapse deformation substantially does not occur at the load-receiving portion 16A of the reinforcement member 16, and a pocket for receiving and stopping the barrier 40 is formed at the inner side in the width direction in relation to the load-receiving portion 16A. The barrier 40 caught in this pocket is hooked on the load-receiving portion 16A at the outer side in the width direction, and, as a result, a displacement in the width direction between the vehicle and the barrier 40 is suppressed. In other words, the passing-through of the vehicle from the barrier 40 is prevented by the hooking of the reinforcement member 16.

As the barrier 40 enters the vehicle inside in a state where the passing-through is prevented, the Fr side member 10 fold-deforms. With this deformation, the front ends of the Fr side member 10 are opened to the outer side in the width direction, and, as a result, passing-through of the vehicle from the barrier 40 is suppressed.

Figure 6:
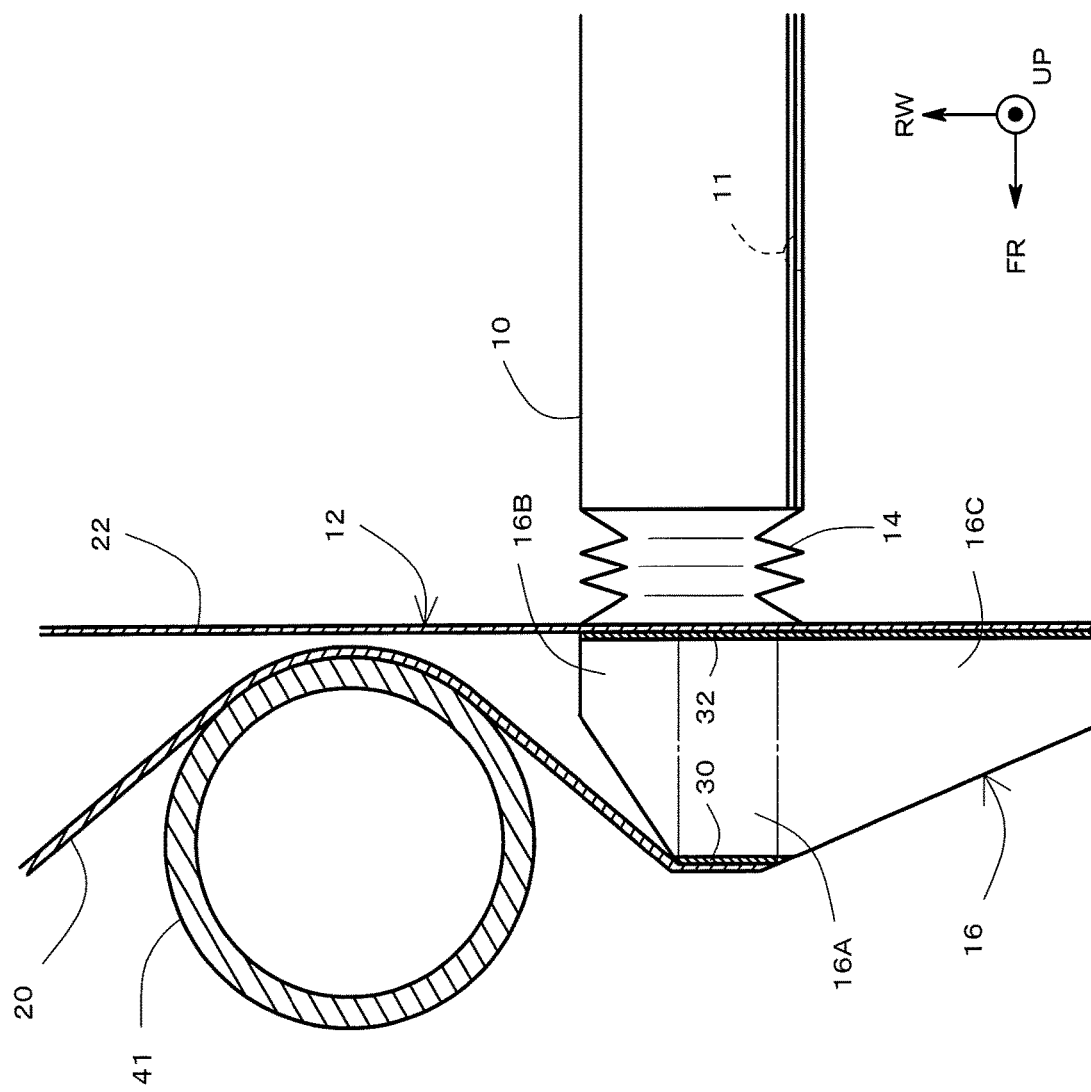
FIG. 6 is a diagram exemplifying a pole front collision.
Figure 7:
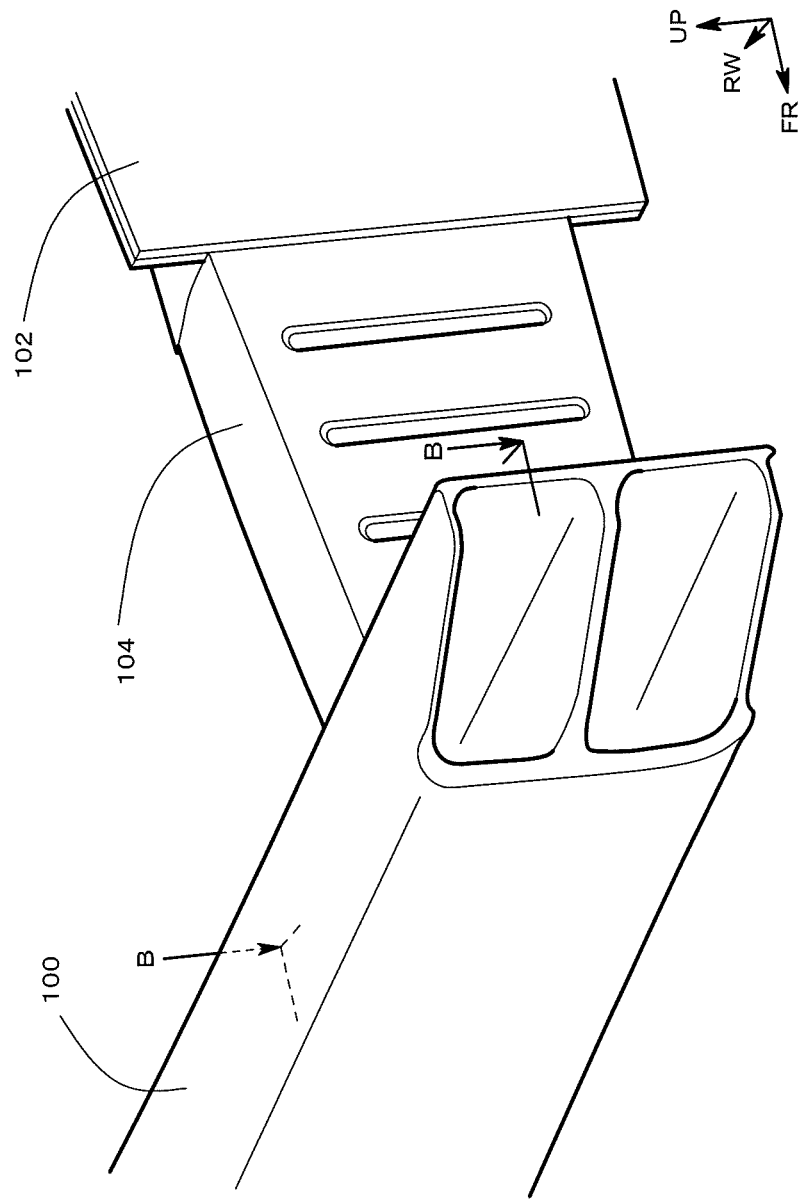
FIG. 7 is a perspective diagram exemplifying a skeleton structure of a front part of a vehicle according to the related art.
Figure 8:
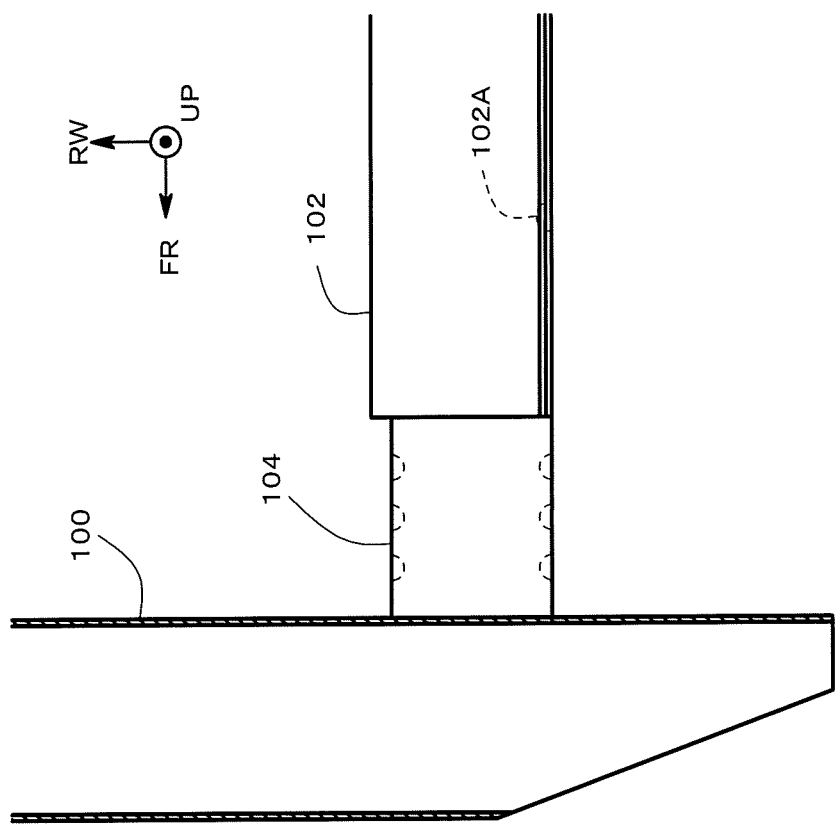
FIG. 8 is a B-B cross-sectional diagram of FIG. 7
Figure 9:
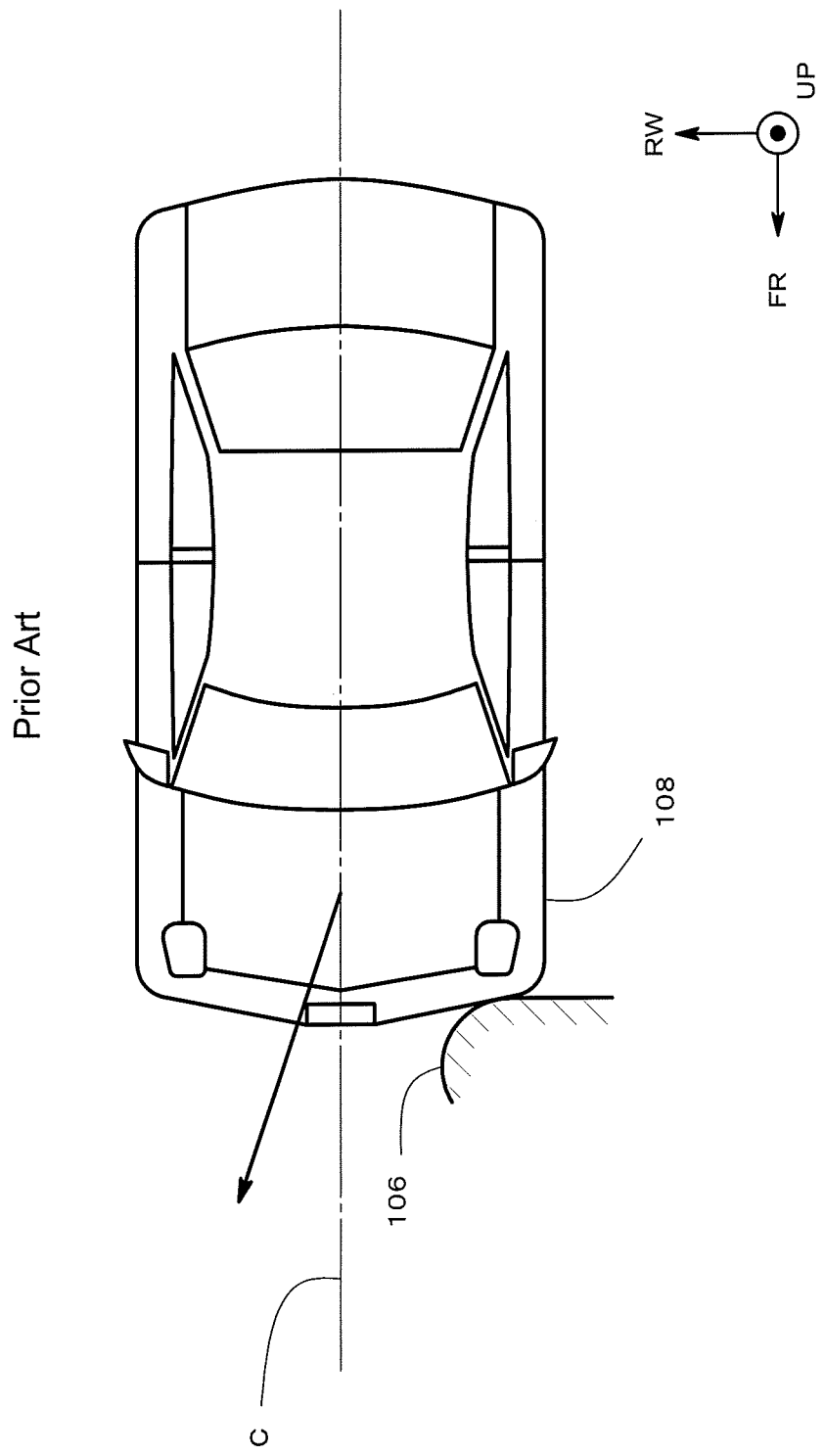
FIG. 9 is a plan view showing a small overlap collision.
Figure 10:
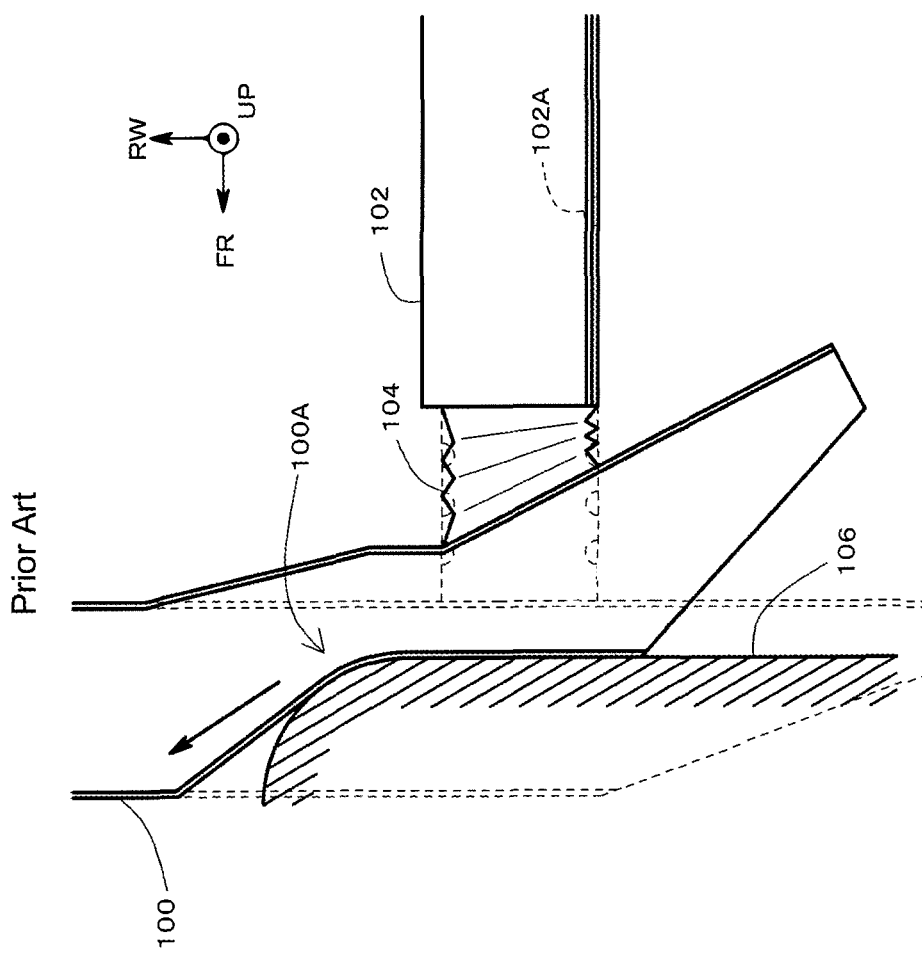
FIG. 10 is a diagram (1/2) for explaining passing-through of a vehicle during a small overlap collision.
Figure 11:
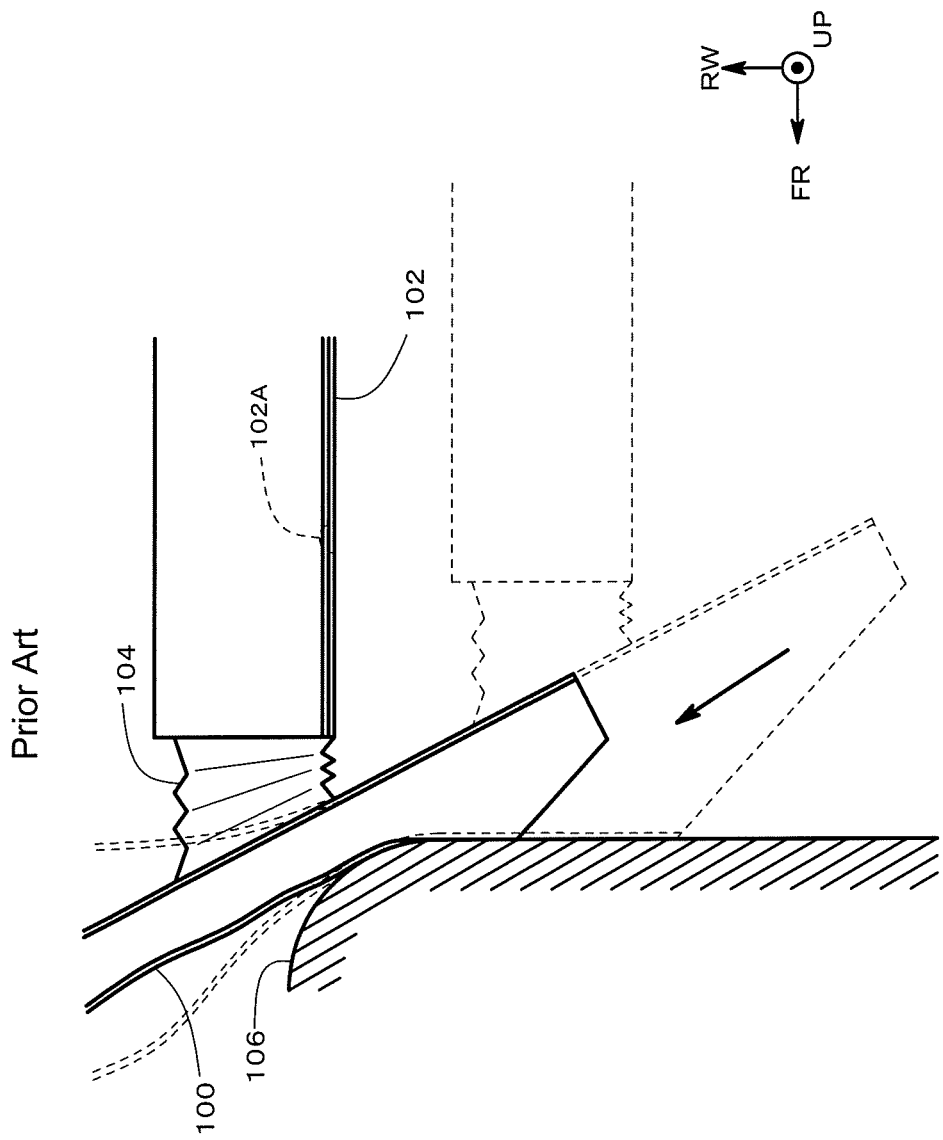
FIG. 11 is a diagram (2/2) for explaining passing-through of a vehicle during small overlap collision.
Figure 12:
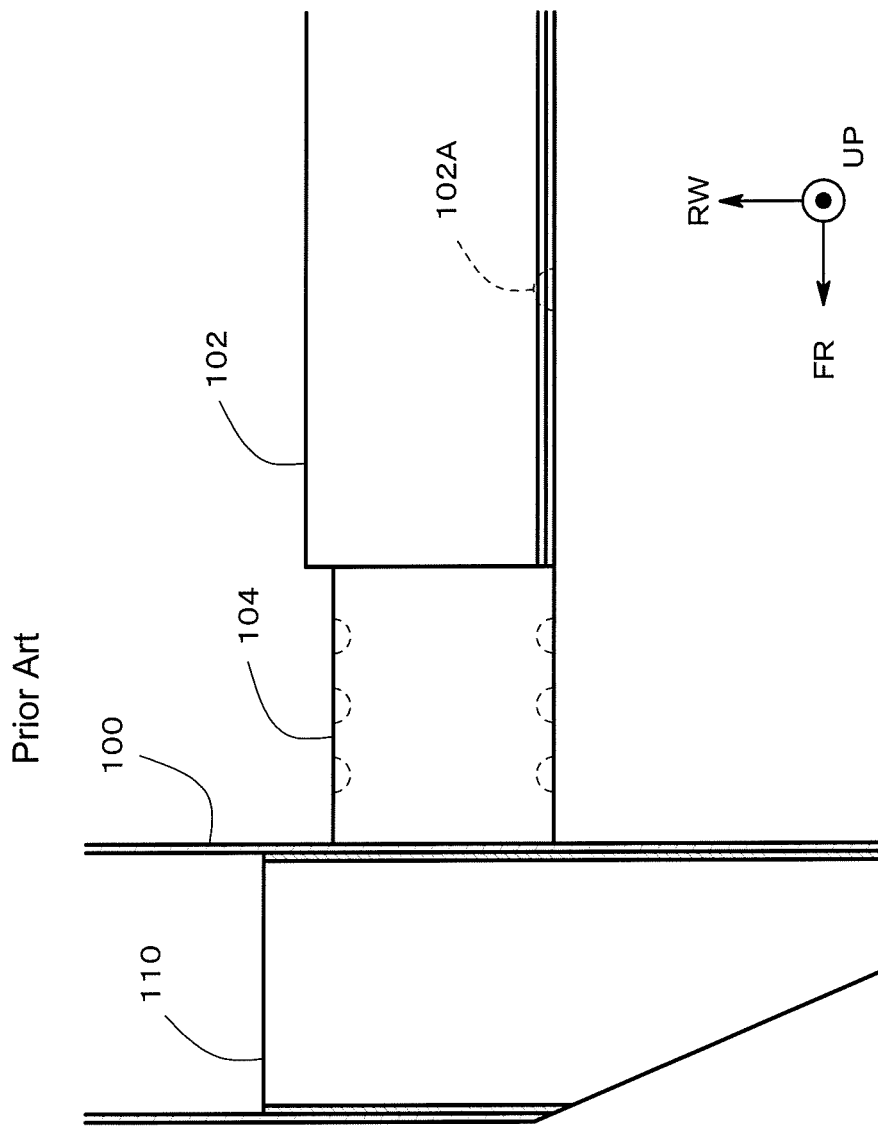
FIG. 12 is a diagram exemplifying a vehicle front part in which a reinforcement member is provided, according to the related art.
Figure 13:
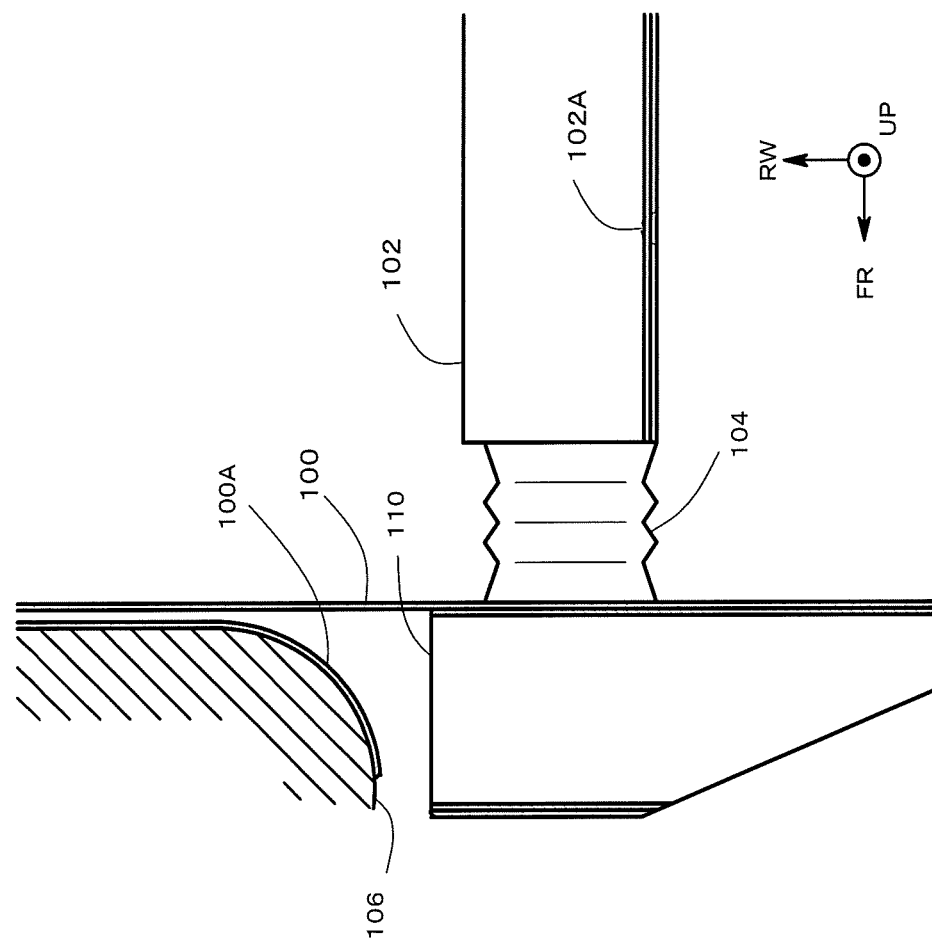
FIG. 13 is a diagram exemplifying a front collision of a vehicle front part according to the related art.

FIG. 6 shows, as a form of the front collision other than the small overlap, a pole front surface collision (pole front collision). As exemplified in FIG. 6, a pole 41 collides with a location, of the bumper R/F 12, at an inner side, in the width direction, in relation to the Fr side member 10. As described above, in the vehicle front part structure according to the present embodiment, a structure is employed in which the reinforcement member 16 is housed at an outer side, in the width direction, from the Fr side member 10. Thus, the collapse deformation of the bumper R/F 12 is enabled at the inner side in the width direction, and the energy of collision is absorbed.

Moreover, because a beveled structure is employed by having the inclined portion 16B at the inner side, in the width direction, of the reinforcement member 16, during the collapse deformation, the shearing at the boundary portion, of the front-side wall 20 of the bumper R/F 12, where the presence and absence of the reinforcement member 16 are switched, can be suppressed.

<Another Configuration of Side Skeleton Member>

In the embodiment shown in FIGS. 1-6, the Fr side member 10 is exemplified as the side skeleton member of the front part of the vehicle, but the side skeleton member is not limited to such a configuration. For example, in a vehicle of a ladder frame type, a side rail corresponds to the side skeleton member, and the reinforcement member 16 of the present embodiment may be applied with respect to the skeleton member including the side rail.

The present disclosure is not limited to the embodiment described above, and includes all changes and modification within the scope and sprit of the present disclosure as defined in the claims.

The invention claimed is:

1. A skeleton structure of a front part of a vehicle, comprising:
  a pair of side skeleton members that are provided on respective sides, in a width direction of the vehicle, of a front part of the vehicle, and that extend in a front-and-rear direction;
  a bumper reinforcement that extends in the width direction of the vehicle, that is connected to front ends of the pair of the side skeleton members, and that has a hollow, closed cross section structure; and
  a reinforcement member that has a higher rigidity than the bumper reinforcement and that is housed in the bumper reinforcement, wherein
  the reinforcement member comprises:
    a load-receiving portion having a length, in the front-and-rear direction of the vehicle, matching a length, in the front-and-rear direction of the vehicle, of an inside of the bumper reinforcement; and
    an inclined portion provided at an inner side, in the width direction of the vehicle, in relation to the load-receiving portion, having a length, in the front-and-rear direction of the vehicle, reduced as a position is separated from the load-receiving portion toward the inner side in the width direction of the vehicle, and which is gradually separated from a front surface of the bumper reinforcement,
  at least a part of the load-receiving portion is placed in front of the side skeleton member, and
  an end, at an inner side in the width direction, of the inclined portion matches in the width direction of the vehicle with a ridgeline at an inner side, in the width direction of the vehicle, of the side skeleton member, or is provided at an outer side, in the width direction of the vehicle, in relation to the ridgeline.

* * * * *